United States Patent [19]

Marple et al.

[11] Patent Number: 4,872,107
[45] Date of Patent: Oct. 3, 1989

[54] FLOPPY DISK CONTROLLER WITH MEANS TO CHANGE CLOCK RATE AUTOMATICALLY

[75] Inventors: Melvyn J. Marple, Newtown; Andrew S. Potemski, New Milford, both of Conn.

[73] Assignee: International Business Machines Corporation, Armonk, N.Y.

[21] Appl. No.: 487,793

[22] Filed: Apr. 22, 1983

[51] Int. Cl.$^4$ .................................................. G06F 13/12
[52] U.S. Cl. ........................ 364/200; 364/248.1; 364/265; 364/265.5; 364/270.6; 371/7; 371/61
[58] Field of Search ................... 371/38, 41, 68, 57, 371/61, 21, 25, 10, 7; 364/148-159, 200 MS File, 900 MS File; 360/86, 97, 98, 99, 135

[56] References Cited

U.S. PATENT DOCUMENTS

| 3,950,735 | 4/1976 | Patel | 364/200 |
|---|---|---|---|
| 4,007,448 | 2/1977 | Sergeant et al. | 364/200 |
| 4,095,267 | 6/1978 | Morimoto | 364/200 |
| 4,217,637 | 8/1980 | Faulkner et al. | 364/200 |
| 4,494,196 | 1/1985 | Greer | 364/200 |

OTHER PUBLICATIONS

Grofton, Peter W., "Mastering Serial Communications", Sybex, pp. 2-3.

Primary Examiner—Gareth D. Shaw
Assistant Examiner—Jonathan C. Fairbanks
Attorney, Agent, or Firm—W. S. Robertson

[57] ABSTRACT

A processor and disk controller are arranged to operate with either of two types of disk drive, a drive for a five and one-fourth inch disk or a drive for an eight inch disk, and a method and apparatus are provided to test a port to detect which type disk is connected. The disk drives do not directly signal their type, and in one operation this information is derived from "drive ready", signals that are supplied separately by each disk type. In an alternative method and apparatus, this information is derived by a test in which the clock speed is changed.

4 Claims, 2 Drawing Sheets

FLOPPY DISK CONTROLLER WITH MEANS TO CHANGE CLOCK RATE AUTOMATICALLY

FIELD OF THE INVENTION

This invention relates to a data processing system having a central processor, floppy disk peripheral storage devices, and a controller for operating the disk according to functions specified by the processor. More specifically the invention relates to a method and apparatus for operating the system with two disk drives that differ in some of their connections and operations with the controller and processor.

RELATED APPLICATIONS

An application Ser. No. 06/487,660, filed on the same day as this application, describes a display system that is used with the data processor of this invention.

RELATED PUBLICATIONS

This invention has been embodied in a data processing system that is described in two publications, "Computer System Operating System Reference Manual Part 1 Operating System" and "Computer System Operating System Reference Manual Part 2 Logical I/O and System Services", which are available from the assignee of this invention and which are incorporated by reference in this specification. They will be referred to as "Part 1" and "Part 2" respectively.

INTRODUCTION

The floppy disk is a familiar component of many data processing systems. Commonly, a disk is five and one-quarter inches in diameter or eight inches in diameter. A component that is called the disk drive rotates the disk and contains a read/write head. A component called a controller has circuits that perform specialized control functions in response to generalized commands from a processor. The description of the preferred embodiment of the invention will point out other conventional features that are significant in understanding this invention.

SUMMARY OF THE INVENTION

In the system of this invention, the processor is provided with ports that can accept connections to a drive for a five and one-quarter inch disk or a drive for an eight inch disk. A clock circuit provides clock pulses at the required rate for either drive, and the system of the invention is operable automatically to test a port to detect the type of drive that is connected and to control the clock for the correct speed. The system is also operable to detect an error that may be caused if a user connects a different drive at a port without manually signalling the system. When such an error is detected, the system changes the clock to the speed for a different drive and makes a test to determine whether this change has corrected the error condition.

Other objects and features of the invention will be apparent from the description of a preferred embodiment of the invention.

THE DRAWING

THE PREFERRED EMBODIMENT

1. Introduction

Figure 1:
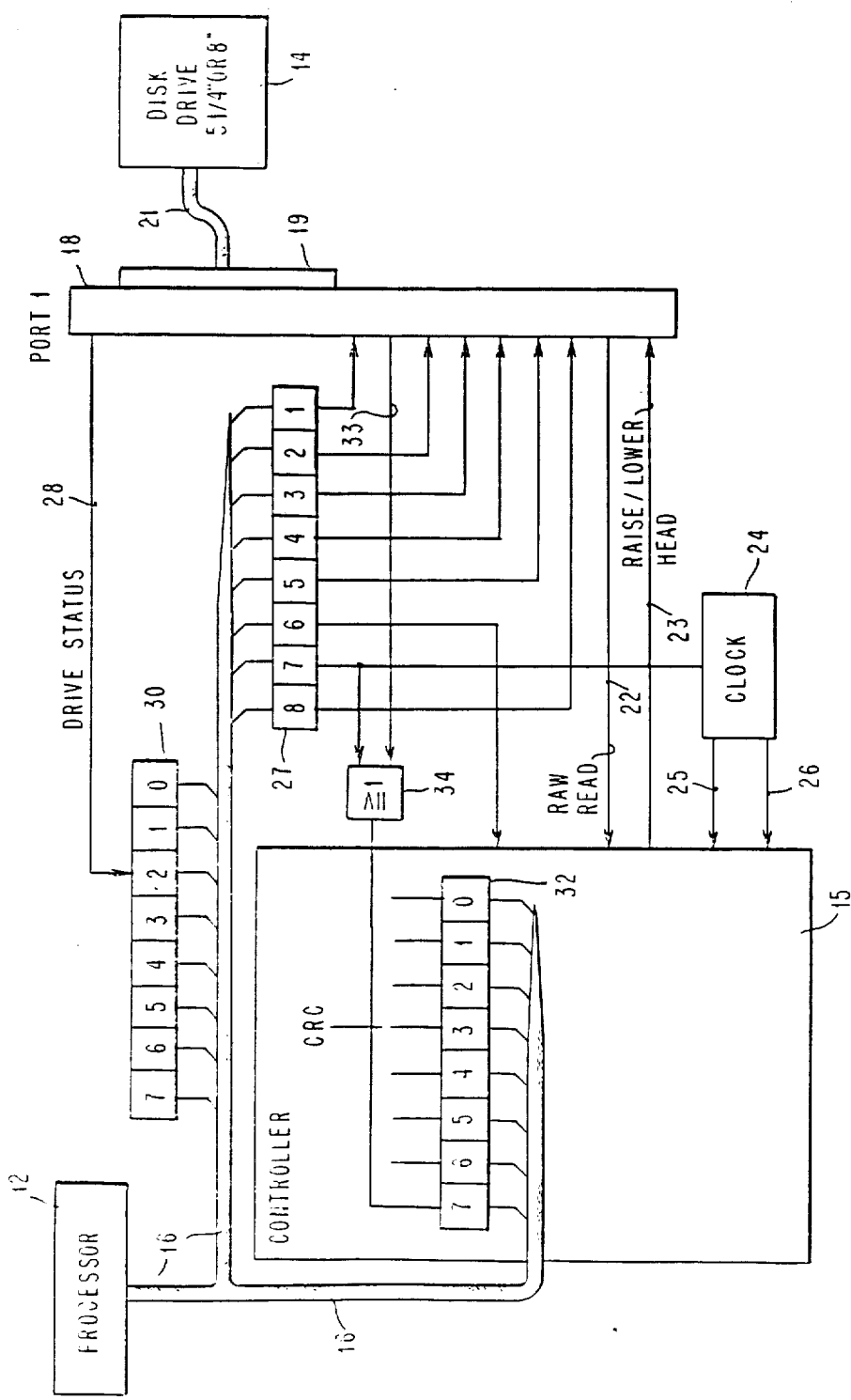
FIG. 1 is a diagram of the data processing system of this invention.
Figure 2:
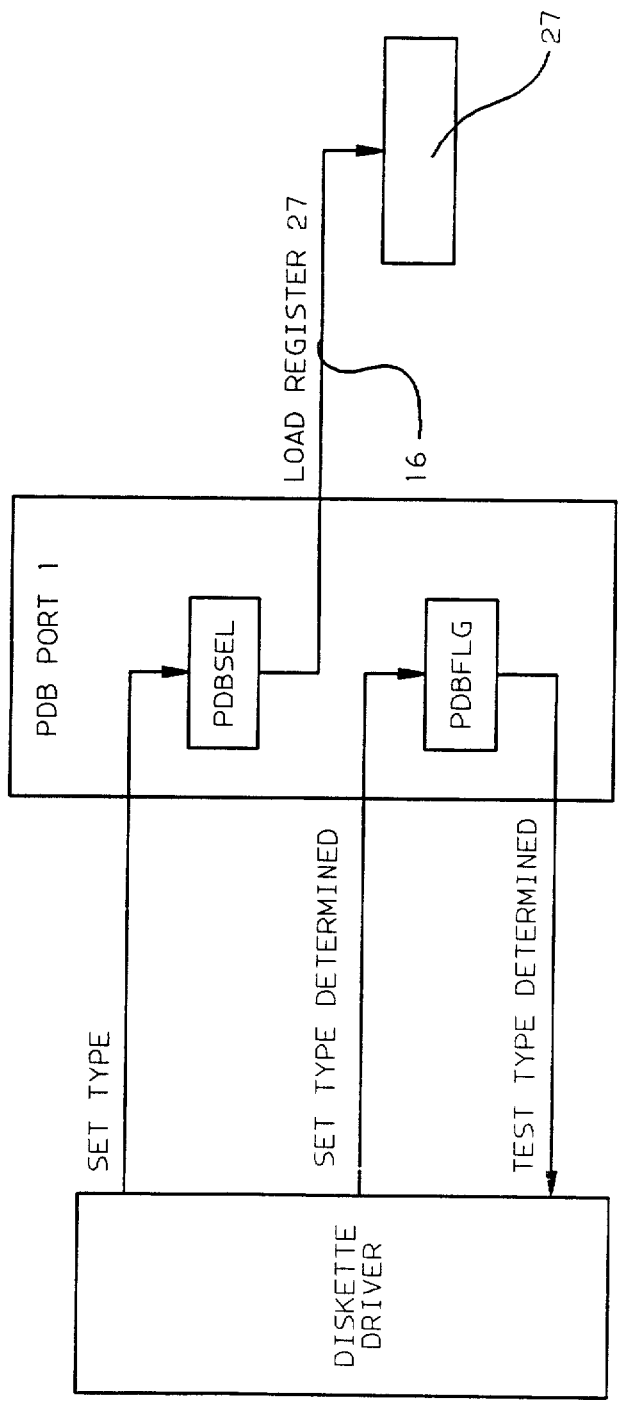
FIG. 2 is a diagram of a diskette driver and a control block that is maintained by the diskette driver for control information used in the data processing system of FIG. 1.

Section 2 introduces the conventional features of the preferred system. Section 3 describes a clock circuit that supplies clock signals for both disk sizes. Sections 4 and 5 describe three registers that are used for status and control information in the operation of the invention. Section 5 describes the ready signals for the two drives. Section 6 summarizes a description in "Part 2" that explains operations to read and load these registers. Section 7 describes an operation to select the disk. Section 8 describes an additional operation to select the disk.

2. Introduction—Conventional Features

The drawing shows a processor 12, a disk drive 14, a disk drive controller 15, a bi-directional bus 16 that interconnects the processor and the controller, and a two part connector 18, 19 and a cable 21 that interconnect the disk drive with the other components. The processor has four ports where a disk drive can be connected. The drawing shows only one port which will be called port 1. Each port has a fixed plug connection 18 for receiving a separable plug 19 from a drive for a five and one-quarter inch disk or from a drive for an eight inch disk. The plug connection 18 at the processor enclosure may be two separate plugs, but it is shown as a single functional block in the drawing because many of the connections are identical for both drives and because the drawing is intended to represent the situation in which the system does not know what drive has been connected to the port.

Although each port has a connector 18, the components to the left of the connector in the drawing are common to all four ports. Circuits that will be described later permit the processor to select one of the ports, and conventional means (not shown) are provided to enable only the selected disk drive to communicate with the controller and the processor.

The disk drive 14 is conventional. An illustrative drive for a five and one-quarter inch floppy disk is described in a publication "SA410/460 96 TPI Single/Double-sided Minifloppy TM Diskette Storage Drives Service Manual" and an illustrative drive for an eight inch floppy disk is described in a publication "SA850/851 Bi-Compliant TM Double Sided Diskette Storage Drive OEM Manual", both from Shurgart Corp. Some of the conventional features of the disk drives will be described later. From a more general standpoint, the disks are peripheral devices that are manually interchangeable by the user of the system and are similar but not identical in their interconnections to the processor and their operations with the processor. Some of these differences will be described later as a further introduction to the invention.

The preferred disk controller 15 has three commercially available circuit modules. A module WD2413 is described in a publication "WD2143-01 Four Phase Clock Generator" and a module WD1691 is described in a publication "WD1691 Floppy Support Logic", both by Western Digital Corporation. A module MB8876A/MB8877A is described in publication "Floppy Disk Formatter/Controller" by Fujitsu Corporation. Generally, on an output operation these modules receive a byte of data from the processor and produce a waveform that combines data and clocking signals that are to be recorded on the disk. On a read operation the modules receive a signal from the drive that is called "Raw Read" and produce data in a form to be used by the processor. The drawing shows representative lines interconnecting the disk drive and the controller: the Raw Data line 22 and a control line 23 Raise/Lower Head.

The bus 16 is one byte wide and interconnects the processor and the controller for transmission in either direction. The bus carries data to or from the disk as has already been described and it carries status and control bytes as will be explained later.

3. The Clock Circuit

It will be helpful to review the general function of a clock in a magnetic recording system. The recording track of a disk is conceptually divided into a sequence of spaces where a 1 bit or a 0 bit can be recorded. A mark is recorded on the track by a change in the direction of magnetization of a magnetic material on the surface of the disk. As an example, a mark in a bit space can represent a 1 bit and the absence of a mark in a bit space can represent a 0 bit. A clock circuit has an oscillator that produces pulses at the same rate that the bit positions pass under the read/write head as the disk is rotated. The clock provides additional pulses at multiple or sub-multiple frequencies. In some systems a clock mark is recorded at the beginning of each bit space so that the absence of a mark following the clock mark can be easily interpreted as a 0 bit. In other systems the oscillator pulses indicate the location of a bit space and clock marks are recorded only as necessary to provide a combination of clock marks and 1 bit marks that is sufficient to keep the oscillator synchronized through a sequence of 0 bits where there would otherwise be no recording marks.

In the circuit of the drawing, a clock circuit 24 provides clocking signals to the controller on lines 25 and 26 for both the five and one-quarter inch disk and the eight inch disk. For a five and one-quarter inch disk the controller uses clock signals of one MHz (megahertz, million clock pulses per second) on line 25 and two MHz on line 26. For an eight inch disk, the controller uses a clock signal of two MHz on line 25 and four MHz on line 26.

The clock conventionally comprises an oscillator and frequency dividers. The oscillator runs at the highest frequency that is required, and the frequency dividers provide sub-multiples of the oscillator frequency. A frequency divider is conventionally formed by one or more trigger circuits. A trigger circuit divides its input by two: it switches its output between logical 1 and 0 levels with each input pulse and thereby produces one output pulse for each two input pulses; a counter formed by a chain of trigger circuits divides the input frequency by a power of 2 that corresponds to the position of the output in the chain of trigger circuits.

A binary valued signal (from bit position 7 of register 27 described later) controls the clock circuit to connect the appropriate points on the divider circuit to lines 25 and 26. Arbitrarily, a 0 bit controls the clock to produce the frequencies for an eight inch disk and a 1 bit controls the clock to produce the frequencies for a five and one-quarter inch disk. A conventional selection circuit for line 25 comprises two AND gates and one OR gate connected to form the logic function Line 25=(Bit 7 AND 1 MHz signal) OR (NOT Bit 7 AND 2 MHz signal). A similar logic network connects line 26 to the 2 MHz and the 4 MHz points in the circuit according to the logic function Line 26=(Bit 7 AND 2 MHz signal) OR (NOT Bit 7 AND 4 MHz signal).

4. The Control Register 27

A register 27 receives a byte of control information from the processor on bus 16 and has connections to transmit this information to the selected disk drive 14 and to the controller 15. A 1 bit in register position 1 selects port 1 which is shown in the drawing. A 1 bit in one of the register positions 2 to 4 selects the corresponding one of the other three disk drive ports. The controller and the other components of the drawing operate the four disk drives one at a time, and logic circuits that are not shown enable circuit paths between the selected drive and the components of the drawing.

Register position 5 controls the drive to operate on one or the other side of a disk that has two recording surfaces. Register position 6 signals the controller that the disk has one or two recording surfaces.

Bit 7 of register 27 controls the clock rate as has already been described and it is also used in a selection network that will be described later. Bit 8 turns on and off the drive motor for the five and one quarter inch disk for a read or write operation. (The drive motor for an eight inch disk runs continuously.)

5. The Status Registers 30 and 32

An eight bit register 30 receives an input at bit position 2 from a line 28 that signals that a drive for a five and one quarter inch disk is ready for read and write operations. This signal will be called "Drive Status" to distinguish it from a corresponding signal for the eight inch disk drive. Other positions of this register are not significant in this description.

An eight bit register 32 is internal to one of the controller modules (the formatter/controller). The module has a two bit input that is controlled by the processor to read this register or to read or write a different register. An OR gate 34 connects bit position 7 of this register to receive the signal from bit position 7 of register 27 or the signal Drive Ready on a line 33 that is connected to a terminal on an eight inch disk drive through connector 18. The operation of this circuit will be described later.

Other positions of register 32 carry status and error signals that are generated by the controller. From the standpoint of this invention, these errors can be divided into two types: an error that might be caused by incorrect clock speed and an error that is ordinarily not caused by incorrect clock speed. Data is recorded with cyclic redundancy code (CRC) bits for detecting and/or correcting certain kinds of errors, and an attempt to read a disk with the wrong clock speed will ordinarily produce a CRC error that will be signalled in register position 3. An example of an error that is not related to clock rate is a failure to find a track that is addressed.

6. Related Operations of the Processor

A read or write operation on a disk takes place through the cooperation of a user program and several programs of the operating system. The operating of the preferred system is described in "Part 2", but it will be helpful to summarize the features that particularly apply to this invention.

The operating system includes a program called the I/O Manager that handles the parts of an I/O operation that are common to all I/O devices, and for specific devices there are specialized programs that are called I/O Drivers. The program that handles disk operations is called the Diskette Driver. The diskette driver maintains a control block for each port that is called a Physical Device Block, PDB. The driver uses the PDB to keep track of the status of the device that is connected to the corresponding port. Two fields of the PDB are used in the operation of this invention: PDBFLG (diskette attribute flags) and PDBSEL (selection control bits).

The PDBSEL field is identical to the contents of control register 27. When a user program selects the disk drive at port 1, the diskette driver fetches the PDB for port 1 and loads field PDBSEL onto bus 16 for entry into register 27.

When the processor initially turned on, bit position 5 of the DCB field PDBFLG is set to a 1. This 1 bit signifies that the driver has not set the PDB to show the configuration of disk drives and it conditions a routine of the driver to test the port. After the driver has made this test successfully, the bit is set to 0.

7. Operations

Suppose that the system has an eight inch disk drive at port 1 and that the processor is turned on. The diskette driver loads a 1 bit into position 5 of field PDBFLG of the PDB to show that the actual configuration of port 1 has not been entered into field PDBSEL, and it begins its routine to test each disk drive port to determine whether a disk drive is attached and whether it is for five and one quarter inch disk or an eight inch disk. Note that a port must be selected before the status lines 28 and 33 are valid. The program first selects for an eight inch drive and tests status and, if this test is unsuccessful, selects for a five and one quarter inch disk drive and tests for status.

The routine loads the following test pattern into PDBSEL: 1 (five and one-quarter inch drive motor off), 0 (clock rate for eight inch disk), 11 (single density, side one), 0001 (select port 1). Because bit 7 of register 27 is set to 0, the output of OR gate 34 is the binary logic value on the line Drive Ready from an eight inch disk drive. If an eight inch disk drive is connected and is ready for operation, the signal Drive Ready is at a down level and a 0 bit (no error) is stored in position 7 of register 32. If there is no eight inch disk drive connected to port 1, then the signal Drive Ready has an up level and a 1 is stored in position 7 of register 32 (error). Register 32 is then read by the processor. If bit position 7 is a 0 and there are no other errors, bit position 5 in field PDBFLG is set to a 1 to show that the status in field PDBSEL is valid. (Field PDBSEL was set to values for an eight inch disk at the start of this example.)

To continue this example, if there is not an eight inch disk drive connected to port 1 or if it is connected but is not ready, a 1 bit from line Drive Ready is loaded into position 7 of register 32. In response to this error message, the driver routine reloads field PDBSEL in the following pattern to select a five and one-quarter inch disk drive: 0 (turn on motor) 0 (forces the system to accept that the disk is ready) and 110001 as before. The processor then reads status register 30. Bit position 2 is a 0 if the drive is ready and in this case, bit 5 is set in PDBFLG to show that the entry in PDBSEL is valid. Otherwise, bit 5 in PDBFLG remains at 0. The test is not completed, whether or not the configuration of port 1 has been established, but if bit of PDBFLG is still a 1, this routine will be repeated later when a user program requests access to port 1.

8. A Further Improvement

Suppose that the system has been operating normally with a five and one-quarter inch disk drive at port 1 and that the user has disconnected this drive and has connected a drive for an eight inch disk. When the disk at port 1 is next accessed, the diskette driver loads register 27 from the PDBSEL which has bit 7 set for the clock rate for a five and one-quarter inch drive. The drive will operate normally for a read operation to find an addressed track except that the data is garbled because the clock speed is wrong. As the invention has been described so far, the controller circuit would signal an error in its internal status register 32 and the diskette driver would branch to an error routine which would print an error message on the associated display screen. The user might recognize the cause of the error and turn the processor off and back on again or the user might perform this operation as a random recovery try. When the processor is turned off and then turned back on again, the diskette driver would construct the appropriate PDB in the way that has already been described.

This invention permits an alternative operation in which the system automatically recovers from such an error. When an error is registered that might signify an incorrect clock speed, the diskette driver changes the PDBSEL to the configuration for the other disk size and retries the selection procedure. As has already been explained, incorrect clock speed will ordinarily produce a CRC error whereas it can not ordinarily produce certain other errors.

As a simple example, the diskette driver can set bit 5 of the PDBFLG to 1 and then test first for an eight inch disk drive and then for a five and one-quarter inch disk drive in the operation that has been described when the processor is reset by being turned off and then turned back on. Alternatively, the diskette driver can (1) switch the PDBSEL to the opposite drive configuration and (2) attempt to select the drive. If in fact the disk drive has been changed, this operation should be successful and the operation can continue. If the drive has not been changed and there in fact has been a normal CRC error, the driver continues with its conventional response to this error. Even if the test is unsuccessful, it is transparent to the user of the system. The test is advantageous because recovery from a CRC error may be difficult.

The programming for this operation is arranged to perform the following sequence of steps. An error is detected in register 32. The error is classified as one of the errors produced by the wrong clock rate or as one of the other errors. If one of the other errors is signalled, the program proceeds as before to recover from the error. If the error is one that may be caused by the wrong clock rate, the system is reconfigured for the other clock rate and the operation is tried again. Means is provided to return to the normal error recovery procedures if the error persists.

9. Other Embodiments

From the detailed description of a preferred embodiment of the invention, those skilled in the art will recognize various modifications in implementation within the spirit of the invention and the scope of the claims.

Having thus described our invention, what we claim as new, and desire to secure by Letters Patent is:

1. In a data processing system having a processor (12) and an I/O controller (15), said controller having a plurality of ports, each port having a plug (18) for connecting the processor and the controller to operate a peripheral device (14) of a first type (8" diskette) or a second type (5¼ diskette), each of said devices having means for signaling a ready condition, said controller having means (bit positions 1-4 in register 27) for selecting one of said ports, wherein the improvement comprises, a first ready signal line (33) connected to each port plug for signaling a ready condition from a device of the first type and a second ready signal line (28) connected to each port plug for signaling a ready condition from a device of the second type, first binary storage means (PDBSEL) in the processor for each port for registering information that a port has a device of the first type or of the second type connected and a second binary storage means (PDBFLG) for registering information that the type is undetermined, and means (diskette driver) operable when the processor is initialized for resetting the second storage means to its undetermined signal state and resetting the first storage means to said first one of said types, a first register (27) for holding the information in the first binary storage means for a selected port, including the device type information, logic and storage means responsive to the device type information in said first register and to said ready signal lines for signaling whether a device of the selected type is ready, driver program means (diskette driver) responsive to a signal in said secondary binary storage means that the type is undetermined to access a peripheral device at the selected port according to the type signaled in the first storage means and for testing said signal that a device of the selected type is ready, and means responsive to a signal that a device of said first type is not ready to make a similar test for a device of the second type.

2. In a system having a processor (12) and a controller (15) for a first drive for a floppy disk of a first clock rate and alternately for a second drive for a floppy disk of a second clock rate, wherein the improvement comprises, a clock (24) providing signals of the first clock rate (25) or signals of the second clock rate (26) to the controller, according to a binary control signal (register 27 bit 7), a first line (33) connectable to a drive of the first clock rate and a second line (28) releasably connectable to a drive of the second clock rate for separately receiving a ready signal from a first drive or a second drive, means (27) providing a binary signal to control the clock rate, logic and storage means responsive to said binary control signal and to said ready signals for signaling that the clock rate is correct or not correct for a device connected to the controller, device driver program means (diskette driver) responsive to said signal that the clock rate is correct or not correct for a connected device for setting said binary control signal for the clock rate of the drive that is connected.

3. In a data processing system having a processor (12) and releasable means connecting the processor to operate with an I/O device having a first clock rate or with a device having a second clock rate comprising, plug means (18) for connecting a device (14) having a first clock rate to operate with the processor and to provide a ready signal at a first ready signal terminal of the system (33) and alternatively for connecting a device having a second clock rate to operate with the processor and to provide a ready signal at a second ready signal terminal of the system (28), a clock (24) operable at the first rate or at the second rate and means (27) for supplying a binary signal to select the clock rate, means (27) providing a binary signal to control the clock rate, logic and storage means responsive to said binary control signal and to said ready signal terminals for signaling that the clock rate is correct or not correct for a device connected to the controller, device driver program means (diskette driver) for initially setting said means for supplying a binary signal for operating the clock at one of said rates and for testing said signal that the clock rate is correct for a connected device and responsive to a signal that the clock rate is not correct to change to said second clock rate and test the second ready terminal.

4. The system of claim 1 wherein said means for signaling that a device of the selected type is ready comprises, a second register (32) having a bit position (seven) for signaling an error to said device driver program, a logic circuit responsive to the selection of a device of said second type (5¼ inch drive) signaled in said first register (27) to register in said second register the ready or not ready status of a device of said first type (8" disk) and responsive to said first register on the selection of a device of said second type for registering a non-error in said second register, wherein said device driver program means comprises means for carrying out the following sequence of steps, loading said first register for selection of a device of said first type, testing said second register (32) for an error and proceeding with operations for said first type device in the absence of an error, in the presence of an error, resetting said first register (27) for a device of said second type and thereby clearing the error condition at the second register (32) and testing said ready line for the device of the second type and proceeding with operations for said second type device if the line signals ready.

* * * * *